United States Patent Office 3,737,471
Patented June 5, 1973

3,737,471
PROCESS FOR REMOVING OXYGEN FROM TETRAFLUOROETHYLENE OR TETRAFLUOROETHYLENE-CONTAINING GAS MIXTURES
Heinrich Paucksch, Hannover, Werner Rudolph, Anderten, Hannover, and Joachim Massonne, Hannover, Germany, assignors to Kali-Chemie Aktiengesellschaft, Hannover, Germany
No Drawing. Filed Nov. 8, 1971, Ser. No. 196,793
Claims priority, application Germany, Nov. 13, 1970, P 20 55 931.3
Int. Cl. C07c 21/18
U.S. Cl. 260—653.3                              4 Claims

ABSTRACT OF THE DISCLOSURE

In a process for removing oxygen from tetrafluoroethylene or tetrafluoroethylene-containing gas mixtures, the gas or gas mixture is contacted with a contact substance of pyrophoric copper in highly dispersed form which is stabilized on a carrier material. The treatment is effected at a temperature between 50 and 160° C. The contents of oxygen in the initial gas or gas mixture should be below 5% by volume.

BACKGROUND OF THE INVENTION

The present invention relates to a process for removing oxygen from tetrafluoroethylene or tetrafluoroethylene-containing gas mixtures.

Gas mixtures of this type occur, for instance, in the pyrolysis of tetrafluoroethylene or in the manufacture of tetrafluoroethylene by pyrolysis of compounds such as difluoromonochloromethane, trifluoromethane, difluoromonobromomethane or similar compounds. The compositions of the gas mixtures depend to a great extent on the conditions of the pyrolysis. Typical compounds which occur in these mixtures are hexafluoropropene, octafluorobutane and fluorine-containing methane and ethane derivatives. In most cases it is unavoidable that in the process of manufacture traces or small amounts of oxygen enter the tetrafluoroethylene or the mixtures containing the same.

It is well known that the presence of traces or small amounts of oxygen in tetrafluoroethylene or tetrafluoromethylene-containing gas mixtures can cause serious complications. Oxygen in an amount of less than 0.01% by volume can be the cause of violent explosions during the compressing of tetrafluoroethylene, because it may start reactions which develop upon generation of substantial amounts of heat and pressure. The presence of oxygen can also be undesirable for the further processing of the tetrafluoroethylene, since, in case of radical polymerization of tetrafluoroethylene, the oxygen may have the effect of an inhibitor.

The removal of the oxygen from the tetrafluoroethylene in prior-art processes is effected by treatment with absorbing agents, for instance with ammoniacal Cu(I)-chloride solution or pyrogallol or by liquefying the tetrafluoroethylene and subjecting it subsequently to a low-temperautre distillation. These prior-art methods, however, are quite unsatisfactory, since not all of the oxygen can be removed with the absorbing agent and, on the other hand, the low-temperature distillation requires substantial expenditures for apparatus for energy.

SUMMARY OF THE INVENTION

In the invention the oxygen is removed from the tetrafluoroethylene or a gas mixture containing the latter compound by contacting the gas or gas mixture with a contact substance of pyrophoric copper of highly dispersed form, the contact substance being stabilized on a carrier material. The treatment is effected at temperatures between 50 and 160° C. The initial gas or gas mixture should contain oxygen in an amount below 5% by volume.

DESCRIPTION OF THE PREFERRED EMBODIMENTS

The concentration of the oxygen in the initial gas mixture must be limited in order to accomplish as complete an elimination of the oxygen as possible. If the oxygen concentration in the initial gas mixture is too high, it is possible, however, to obtain a more desirable oxygen concentration by special steps, for instance by adding pre-purified gas in the necessary amount to the initial gas mixture or by operating in a partial vacuum so as to have an oxygen partial pressure below 40 torr. It is also possible to subject the gas mixture to a pre-purification with absorbing agents such as a pyrogallol solution or an ammoniacal copper(I)-chloride solution. Preferably, the oxygen contents in the initial gas mixture should be below 1% by volume.

The use of highly dispersed so-called pyrophoric copper on carrier materials for removal of oxygen from inert gases, for instance nitrogen, is not new. However, this material had never been used for the removal of oxygen from tetrafluoroethylene and no suggestion had ever been made regarding such use. This is explained by the fact that pyrophoric copper, as is well known, may react with chlorinated olefins such as vinyl chloride or vinylidene chloride. Thus, pyrophoric copper is used for instance to remove vinyl chloride from hydrogen and in this process a removal of the vinyl chloride to below 0.1 p.p.m. is accomplished.

It was therefore unexpected and unpredictable that tetrafluoroethylene and the compounds which are present in the pyrolysis gas mixtures, particularly hexafluoropropylene, would not be subject to attack by the highly dispersed pyrophoric copper.

As copper contacts or catalysts it is possible to use those materials which are conventionally used for the removal of oxygen from nitrogen. For instance a catalyst can be used of dispersed copper deposited on infusorial earth. This material is obtained by treatment of a mixture of copper(II)-chloride dihydrate and infusorial earth with a sodium hydroxide solution, followed by removal of the oxide mixture by suction and drying of the comminuted product at 150–180° C., and finally reduction of the copper oxide with hydrogen as described in Houben-Weyl, vol. 1/2, 1959, p. 329.

It is also possible to use the contacts which are commercially available for this purpose in oxidized form after reducing them with hydrogen or carbon monoxide.

By suitable selection of the oxygen concentration in the initial gas mixture and of the temperature and duration of treatment, it is possible to reduce the oxygen concentration in the gas mixture to an amount no longer determinable by measurement. The copper in this process is oxidized to copper(II)-oxide. The spent contact can then be regenerated by treatment with hydrogen or carbon monoxide, as is customary. The process can be carried out both in solid-bed as well as in fluidizing bed reactors.

The following examples will further illustrate the invention. The composition of the gas mixture in these examples was established by gas chromatography. It was necessary for this purpose to calculate the oxygen volume concentration in the gas mixture, since the gas chromatography permits only to obtain the sum of oxygen and argon. Assuming that nitrogen and argon are always present in the gas mixture in the same ratio, the contents of oxygen was calculated by subtracting the calculated argon amount from the gas chromatographically obtained value for the sum of oxygen and argon.

EXAMPLE 1

150 cc. of a contact consisting of highly dispersed copper on infusorial earth made according to the description in Houben-Weyl, 1959, vol. 1/2, page 329 were heated in a glass tubing having a double jacket in the manner of a Liebig condenser to a temperature of 50° C. Across this contact there were then passed two liters of tetraflouroethylene per hour in which the oxygen contents was 0.043% by volume (see Table 1, composition I). The oxygen content in the purified tetrafluoroethylene was 0.008% by volume.

EXAMPLE 2

150 cc. of a copper catalyst commercially available under the name "BTS-Catalyst" and made by the Badische Anilin & Soda-Fabrik of Germany. The catalyst contained 30% copper and was then reduced with hydrogen. At a temperature of 70° C., 2 liters of tetrafluoroethylene per hour were passed across a catalyst. The tetrafluoroethylene contained oxygen in an amount of 0.038 vol. percent. In the purified product, oxygen could no longer be established (see Table 1, compositions III and IV).

In a further test, 2 liters of tetrafluoroethylene were passed per hour over 150 cc. of the same contact, the tetrafluoroethylene in this case, however, containing 0.017% by volume of oxygen. The temperature in this test was 100° C. In the purified product, no oxygen could be determined (see Table 1, compositions V and VI).

EXAMPLE 3

Across 150 cc. of the contact used in Example 2 there were passed 2 liters per hour of a gas mixture of tetrafluoroethylene which had been enriched by adding air. The temperature was 100° C. The oxygen content of the mixture was 3.15 vol. percent. In the purified product there were found only 0.03 vol. percent of oxygen (see Table 1, compositions VII and VIII).

TABLE 1

| | Temp. (° C.) | | | | | | | |
|---|---|---|---|---|---|---|---|---|
| | 50 | | 70 | | 100 | | 100 | |
| | I | II | III | IV | V | VI | VII | VIII |
| Analysis (vol. percent): | | | | | | | | |
| $O_2$ plus Ar | 0.046 | 0.015 | 0.04 | 0.002 | 0.023 | 0.004 | 3.3 | 0.20 |
| $N_2$ | 0.27 | 0.60 | 0.16 | 0.17 | 0.48 | 0.31 | 12.4 | 14.7 |
| $C_2F_4$ | 99.7 | 99.4 | 99.8 | 99.8 | 99.5 | 99.65 | 84.3 | 85.1 |
| $O_2$ | 0.043 | 0.008 | 0.038 | | 0.017 | | 3.15 | 0.03 |
| Ar | 0.003 | 0.007 | 0.002 | 0.002 | 0.006 | 0.004 | 0.15 | 0.17 |

EXAMPLE 4

Across the catalyst described in Example 1 in an amount of 150 cc. there were passed 4 liters of gas per hour having the composition indicated at IX in Table 2. The temperature in this case was 150° C. The purified mixture contained no oxygen that could be traced (see Table 2, composition X).

TABLE 2

| | Temp. 150° C. | |
|---|---|---|
| | IX | X |
| Analysis (vol. percent): | | |
| $O_2$ plus Ar | 0.04 | 0.011 |
| $N_2$ | 0.85 | 0.91 |
| $C_2F_4$ | 43.7 | 43.6 |
| $C_3F_6$ | 2.7 | 2.7 |
| $C_4F_8$ | 3.6 | 3.6 |
| $CHF_2Cl$ | 49.1 | 49.2 |
| $O_2$ | 0.03 | |
| Ar | 0.01 | 0.011 |

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be secured by Letters Patent is set forth in the appended claims:

1. A process for removing oxygen from tetrafluoroethylene or a tetrafluoroethylene-containing gas mixture comprising the steps of contacting the tetrafluoroethylene or the gas mixture in which gas or gas mixture the oxygen is present below 5% by volume with a contact substance of pyrophoric copper in highly dispersed form which is stabilized on a carrier material, the treatment being effected at a temperature of 50 to 160° C.

2. The process of claim 1, wherein a pretreated gas from which at least part of the oxygen has been removed is added to the pentafluoroethylene gas or gas mixture to reduce its content of oxygen prior to the treatment defined in claim 1.

3. The process of claim 1, wherein the tetrafluoroethylene or gas mixture is adjusted to an oxygen partial pressure below 40 torr.

4. The process of claim 1, wherein the tetrafluoroethylene gas or gas mixture is subjected to preliminary treatment with an oxygen absorbing agent.

References Cited

FOREIGN PATENTS 1,170,988  1/1959  France.

DANIEL D. HORWITZ, Primary Examiner